3,036,060
NEW ORGANIC COMPOUND

Robert Armistead Lucas, Mendham, and Daniel Frederick Dickel, Berkeley Heights, N.J., assignors to Ciba Corporation, a corporation of Delaware
No Drawing. Filed Aug. 25, 1958, Ser. No. 757,095
4 Claims. (Cl. 260—210.5)

This invention relates to a new, crystalline substance, hereinafter called conopharyngine, the salts thereof, as well as to process for the preparation of such compounds.

According to the present invention, conopharyngine in substantially pure form is prepared from plant material of the Conopharyngia species, an Apocynaceae genus, for example, from plant material of *Conopharyngia pachysiphon*. The new compound may be obtained from the stem bark of this plant, however, it is preferably prepared from root material.

Conopharyngine is the 3-D-β-glucoside of Δ$^5$-20α-amino-3β-hydroxy-pregnene of the formula

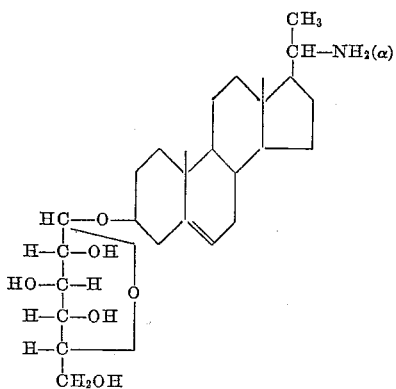

It melts at 285–288° C. and analyzes for the empirical formula $C_{27}H_{45}O_6N$. It is insoluble in most organic solvents and in basic medium, for example, in aqueous alkaline medium, such as an alkali metal hydroxide, e.g. sodium or potassium hydroxide, an alkali metal carbonate, e.g. sodium carbonate or potassium hydrogen carbonate, or ammonia; it is soluble in low concentration in methanol, or in a mixture of methanol and p-dioxane, and soluble in an acidic medium, such as in aqueous mineral acid, e.g. hydrochloric, sulfuric or phosphoric acid, or in a water-miscible lower alkanoic acid, e.g. formic or acetic acid. The new compound may be recrystallized from methanol.

The infrared absorption spectrum, taken in Nujol, a hydrocarbon oil, shows the following bands (expressed in reciprocal centimeters and classified in groups of diminishing strength): strong bands at 2860–2960, 1460, 1376, 1068 and 1016; medium bands at 3400, 3265, 1308, 1280, 1161, 1128, 1113, 1044, 924 and 896; medium-weak bands at 3226, 1265 and 1194; weak bands at 1595, 974, 950, 865, 837, 821, 795, 718 and 690; and shoulders at 1364, 1346 and 1084.

In the paper chromatographic assay conopharyngine shows an $Rf=0.72$ on Whatman No. 1 paper in n-butanol saturated with water.

Salts of the new crystalline substance of this invention are particularly therapeutically useful acid addition salts, for example, those with inorganic acids, such as mineral acids, e.g. hydrochloric acid or hydrobromic acid, sulfuric or phosphoric acids; or those with organic acids, such as lower aliphatic carboxylic acids, e.g. formic, acetic, propionic or pivalic acid; lower aliphatic dicarboxylic acids, e.g. oxalic, malonic, succinic, glutaric, maleic or fumaric; lower hydroxy-aliphatic acids, e.g. glycolic or lactic acid; hydroxy-lower aliphatic dicarboxylic acids, e.g. malic, tartaric, hydroxymaleic or dihydroxymaleic acid; hydroxy-lower aliphatic tricarboxylic acids, e.g. citric acid; keto-lower aliphatic carboxylic acids, e.g. pyruvic acid; lower aliphatic sulfonic acids, e.g. methane sulfonic, ethane sulfonic or hydroxyethane sulfonic acid; aryl carboxylic acids, e.g. benzoic, 4-hydroxybenzoic, anthranilic, salicylic, 4-aminosalicylic, 2-phenoxybenzoic, or 2-acetoxybenzoic; araliphatic acids, e.g. phenylacetic, cinnamic or mandelic acid; aryl sulfonic acids; e.g. benzene sulfonic, p-toluene sulfonic, sulfanilic or naphthalene sulfonic acid; amino acids, e.g. methionine, tryptophane, lysine or arginine; or with acidic polyhydroxy compounds, e.g. ascorbic acid. Salts which may be used to isolate and/or characterize the new compound of this invention may also be sparingly soluble salts with acidic organic nitro compounds, e.g. picric or picrolonic acid; organic sulfonic acids, e.g. flavianic acid; metal complex acids, e.g. tetrathiocyano-diammono-chromic, phosphotungstic, phosphomolybdic or chloroplatinic acid; or certain inorganic acids, e.g. nitric, thiocyanic or perchloric acid.

The new crystalline compound of this invention and the salts thereof are characterized by a strong hypotensive effect free from any adverse side effects, such as respiratory depression, and may be used to normalize the blood pressure in cases of hypertension. They may, for example, be employed in cardiovascular research on animals. The new compound and the salts thereof may also be administered as hypotensive drugs in the form of pharmaceutical preparations, which contain the new compound or the salts thereof in admixture with a pharmaceutical organic or inorganic, solid or liquid carrier suitable for enteral, e.g. oral, or parenteral, e.g. intravenous, application. For making up the preparations there may be employed substances which do not react with the new compounds, such as water, gelatine, lactose, starches, magnesium stearate, talc, vegetable oils, benzyl alcohols, gums, polyalkylene glycols, petroleum jelly or any other known carrier for medicaments. The pharmaceutical preparations may be in solid form, for example, as tablets, dragees or capsules, or in liquid form, for example, as solutions, emulsions or suspensions. If desired, they may contain auxiliary substances, such as preserving agents, stabilizing agents, wetting or emulsifying agents, salts for varying the osmotic pressure or buffers. They may also contain, in combination, other therapeutically useful substances. The new compositions contain preferably from about 0.1 mg. to about 100 mg. of the active compound per dosage unit. The actual dose administered in therapy depends largely on the condition of the individual patient and the desires of the practicing physician.

In contrast to heterogeneous and crude preparation from plants of the Conopharyngia species, the present invention provides a pure compound and salts, for example, water-soluble salts, thereof, which may be formulated into compositions containing exact amounts of the active substance to produce a predictable and reproducible hypotensive effect. Compositions containing the pure crystalline substance have a uniform and invariable potency contrary to preparations which may be made up from plant material or extracts thereof and, therefore, contain a varying amount of active material. Conopharyngine, a substantially pure alkaloidal substance and the salts thereof, can be dissolved in solvents and may, therefore, be used for the preparation of solutions which can be administered parenterally, for example, intravenously, to obtain a fast onset of action, which is not possible with plant material or crude extracts thereof.

The new compound, conopharyngine, and the salts thereof, may be prepared by treating plant material of a Conopharyngia species or an alcohol extract thereof with a solvent mixture comprising at least one sparingly water-miscible solvent selected from the group comprising hydrocarbons, halogenated lower aliphatic hydrocarbons and lower alkanols, and at least one water-miscible solvent selected from the group comprising lower alkanols, lower alkanoic acids, aqueous mixtures thereof and water, treating the extract resulting from the fraction comprising the water-miscible solvent and containing a salt of conopharyngine with a basic reagent, and isolating and crystallizing conopharyngine and, if desired, converting the resulting conopharyngine into a salt thereof.

The above described process may be carried out according to the general procedure known as distribution or partition, i.e. the plant material or an extract thereof is distributed in a two-phase solvent system, if desired, in the presence of an adsorbent, or in a one-phase solvent system in the presence of an adsorbent. Sparingly water-miscible hydrocarbons are, for example, aliphatic hydrocarbons, such as alkanes, e.g. hexane, or aromatic hydrocarbons, e.g. benzene, toluene or xylene; halogenated aliphatic hydrocarbons are, for example, methylene chloride, chloroform, ethylene chloride or 1,1,1-trichloroethane, and sparingly water-miscible lower alkanols are particularly n-butanol, isobutanol and n-pentanol. Water-miscible lower alkanols are methanol, ethanol, propanol, isopropanol or tertiary butanol; water-miscible lower alkanoic acids are formic, acetic or propionic acid. As adsorbents those materials may be used which adsorb either the desired material or the impurities, or slow down the flow rate of one of the solvents. Such adsorbents are, for example, cellulose or cellulose acetate, starch, talc, diatomaceous earth, magnesia-silica gel adsorbents, aluminum oxide, such as acid washed aluminum oxide, and, particularly silicic acid. The process for preparing the new compound may be carried out according to known procedures, such as chromatography on a column containing an adsorbent, countercurrent distribution in the absence of an adsorbent, extraction of the starting material with one solvent phase and treatment of a resulting extract with the second solvent phase, if desired, in the presence of an adsorbent, or extraction with the two-phase solvent phases.

The extraction process may be repeated on the starting material to increase the yields of the desired product, or, certain fractions obtained according to the above-described process may be treated the same way to secure a more thorough separation.

The resulting extract, containing a conopharyngine salt, particularly the hydrochloride, is subsequently treated with a basic reagent to liberate the conopharyngine base. Ammonia is the preferred reagent; however, an alkali metal hydroxide, such as lithium, sodium or potassium hydroxide, may be used as well. The treatment with the basic reagent may be carried out in an aqueous solution, or in an organic solvent, such as lower alkanol, e.g. methanol or ethanol, and the desired compound is isolated by removing the solvent and working up the resulting residue.

The pure crystalline conopharyngine is obtained by crystallization, for example, by concentrating a solution of the resulting residue in methanol, or by crystallizing from a mixture of methanol and p-dioxane; conopharyngine may be recovered in crystalline form by filtration or centrifugation and recrystallized, if desired, from methanol.

Apart from plant material an alcohol extract thereof may be used as the starting material in the above reaction. Such an extract is prepared by treating the plant material with a lower alkanol, particularly methanol, either batchwise or continuously. The residue resulting after the removal of the lower alkanol may be used directly or may be treated with a sparingly water-miscible solvent to remove waxy and/or fatty material. For example, the lower alkanol extract may be treated with an ether, e.g. diethylether; a hydrocarbon, such as an aliphatic hydrocarbon, e.g. hexane, or an aromatic hydrocarbon, e.g. benzene, toluene or xylene; or a halogenated aliphatic hydrocarbon, e.g. methylene chloride, chloroform or ethylene chloride.

Conopharyngine, as obtained according to the above process, may be converted into the therapeutically useful salts thereof by treatment with one of the afore-mentioned acids, for example, by treating a lower alkanol, e.g. methanol, solution or an ether, e.g. p-dioxane, solution or a mixture of these solvents with an acid, which may be used in solution, for example, in a lower alkanol, e.g. methanol, ethanol, propanol or isopropanol, solution. Additional salts, used particularly for identification purposes, are, for example, sparingly soluble salts with heavy metal complex acids, e.g. Reineckate, phosphotungstate or phosphomolybdate; with acidic organic nitro compounds, e.g. picrate or picronolate; or with organic sulfonic acids, e.g. flavianate. These salts may be prepared, for example, by treating an acid, e.g. acetic acid, solution of conopharyngine with an alkali metal, e.g. lithium, sodium or potassium, or an ammonium salt of the corresponding heavy metal complex acid, acidic organic nitro compound or organic sulfonic acid. The sparingly soluble salt of conopharyngine with the above acid compounds usually precipitates and may be reconverted into the free base by treatment with an alkaline reagent, for example, an alkali metal hydroxide, e.g. lithium, sodium or potassium hydroxide; an alkali metal carbonate, e.g. sodium carbonate or potassium hydrogen carbonate, or ammonia, which reagents are preferably used in aqueous or alcohol, such as lower alkanol, e.g. methanol or ethanol, solution, or by disintegration on a base-liberating adsorbent, for example, on an anion exchange resin, such as a basic amine-type anion exchange resin.

The conopharyngine hydrochloride which is obtained in the fraction resulting from the procedure for the preparation of conopharyngine prior to the treatment with an alkaline reagent, may, therefore, also be prepared by treating plant material of Conopharyngia or a lower alkanol extract thereof with a solvent mixture containing at least one sparingly water-miscible solvent selected from the group consisting of hydrocarbon, halogenated lower aliphatic hydrocarbon and lower alkanol, and at least one water-miscible solvent selected from the group consisting of lower alkanol, lower alkanoic acids, aqueous mixture thereof and water, isolating the conopharyngine hydrochloride from the fraction containing the water-miscible solvent and crystallizing the desired salt. The thus prepared hydrochloride is identical with the salt obtained by treating conopharyngine with hydrochloric acid according to the above-described procedure.

This is a continuation-in-part of our copending application Serial No. 724,877, filed March 31, 1958 (now abandoned).

The following examples illustrate the invention; they are not to be construed as being limitations thereon. Temperatures are given in degrees centigrade.

*Example 1*

A mixture of 100 g. of ground root of *Conopharyngia pachysiphon* and 500 ml. of methanol is refluxed for one hour, then filtered and the residue washed with methanol. This operation is repeated with 400 ml. and twice with 300 ml. of methanol, the methanol extracts are combined and evaporated at 40–60° under reduced pressure, to leave 9.3 g. of residue.

5.95 g. of this residue is slurried in benzene and boiled on the steam bath. After cooling, the slurry is poured on a column containing 300 g. of silicic acid (100 mesh, Mallinckrodt), and the flow rate is adjusted to about 85–90 ml. per hour by adding benzene to the column. A total of 1500 ml. of benzene solution is collected to yield 0.22 g. of residue (fraction I) after evaporation of the solvent. Chloroform is then added to the column and a total of 4500 ml. of solvent is poured through the adsorbent, leaving 0.67 g. of residue (fraction II). 1000 ml. of a mixture of chloroform and methanol (80 parts by volume: 16 parts by volume) elutes 0.72 g. of solid material (fraction III) and 2700 ml. of a mixture of chloroform and methanol (50 parts by volume: 50 parts by volume) yields 2.94 g. of residue (fraction IV). The column is then washed with about 1000 ml. of methanol, whereby the remaining undissolved matter on top of the column is dissolved; 1.29 g. of residue is obtained after evaporation of the solvent (fraction V). The weight of the fractions is taken from wet material.

The residue obtained from the 50:50-mixture of chloroform and methanol (fraction IV) is slurried in a mixture of chloroform and methanol (80:16) and placed on a column of 50 g. of silicic acid. 1500 ml. of this solvent mixture yields 1.8 g. of solid residue (fraction IA), the following 200 ml. 0.13 g. (fraction IIA) and the next 400 ml. 0.25 g. (fraction IIIA). The column is then washed with a mixture of chloroform and methanol (50:50); 1500 ml. yield 0.61 g. (fraction IVA) and about 1000 ml. yield 0.30 g. (fraction VA) of solid material (weight taken of wet material).

The fraction resulting from the elution with chloroform-methanol (80:16), fraction IA, is partially dissolved in a mixture of chloroform and methanol (95 parts by volume: 5 parts by volume), the mixture is heated, the partially crystalline precipitate, formed after cooling, is filtered off and the treatment is repeated. A total of 0.24 g. of air-dried crystalline material is obtained. This material contains conopharyngine hydrochloride, having an $Rf=0.62$ on Whatman No. 1 paper in n-butanol saturated with water.

0.1 g. of crystalline material obtained according to the above procedure is dissolved in 5 ml. of water, the aqueous solution is filtered, and the filtrate is made basic with concentrated aqueous ammonia. The resulting precipitate is filtered off, washed with water and extracted with hot methanol. The solution is concentrated to a small volume under reduced pressure, the resulting crystalline conopharyngine is filtered off, washed with methanol and air-dried; yield 0.075 g.

Conopharyngine melts at 285–288° and analyzes for $C_{27}H_{45}O_6N$: its infrared absorption spectrum, taken in Nujol shows the following bands (expressed in reciprocal centimeters and classified in groups of diminishing strength): strong bands at 2860–2960, 1460, 1376, 1068 and 1016; medium bands at 3400, 3265, 1308, 1280, 1161, 1128, 1113, 1044, 924 and 896; medium weak bands at 3226, 1265 and 1194; weak bands at 1595, 974, 950, 865, 837, 821, 795, 718 and 690; and shoulders at 1364, 1346 and 1084. In the paper chromatographic assay it shows an $Rf=0.72$ on Whatman No. 1 paper in n-butanol saturated with water.

Example 2

0.05 g. of the methanol extract obtained from ground root material of *Conopharyngia pachysiphon* is dissolved in wet n-butanol and is placed on a column prepared from 10 g. of cellulose powder in saturated aqueous n-butanol. The column is developed with saturated aqueous n-butanol; fractions of 5 ml. of solvent are taken and evaporated to dryness. The eleventh fraction contains a white residue which is rechromatographed on paper. It shows the same $Rf=0.62$ as the crystalline material resulting from fraction IA of Example 1, and can be converted into conopharyngine upon treatment with aqueous ammonia according to the procedure in Example 1.

Example 3

A mixture of 0.06 g. of conopharyngine is dissolved in 30 ml. of ethanol and two drops of aqueous hydrogen chloride are added. The mixture is warmed to complete solution, filtered, and the solvent is evaporated to leave a white residue. The procedure is repeated; the evaporation is not carried to completion, the crystalline material is filtered off and washed with ethanol to yield 0.06 g. of the crystalline conopharyngine hydrochloride, M.P. 245–249. It analyzes for $C_{27}H_{45}O_6N.HCl$, has a $pK'=9.57$ (in 80 percent ethylene glycol mono-methyl-ether) and an optical rotation $$[\alpha]_D^{26} = -63.1 \pm \tfrac{5}{3}$$

(in 90 percent pyridine: 10 percent water).

It is soluble in water, in dilute hydrochloric acid, in a 1:1:1-mixture of acetic acid:ethanol:aqueous hydrochloric acid (1:1); moderately soluble in ethanol and slightly soluble in a mixture of chloroform and methanol. It is insoluble in pyridine, but soluble in 90 percent aqueous pyridine. The free conopharyngine base is precipitated by treating an aqueous solution of the hydrochoride with ammonia.

The infrared absorption spectrum of conopharyngine hydrochloride, taken in Nujol, shows the following bands (expressed in reciprocal centimeters and classified in groups of diminishing strength): strong bands at 2860–2960 (broad), 1462, 1378, 1270, 1134, 1078, 1048, 1036 and 1015; medium bands at 3378, 3270, 1633, 1504, 1364, 1306, 1256, 1240, 1200 and 1153; weak bands at 951, 920, 895, 883, 844, 826, 800 and 720; shoulders at 1407, 1344, 1290, 1213, 1107, 1060, 1000, 980 and 964.

The ultraviolet absorption spectrum of conopharyngine hydrochloride, taken in water, shows the following bands (expressed in m$\mu$): $\lambda_{max}$ at 281 ($\epsilon=12.1$) and 324–326 ($\epsilon=7.6$); and $\lambda_{min}$ at 256–260 ($\epsilon=8.9$) and 310–314 ($\epsilon=7.3$).

In the paper chromatographic assay it shows on $Rf=0.62$–0.64 on Whatman No. 1 paper in n-butanol saturated with water.

The general process for the preparation of conopharyngine may be modified in such manner, that the treatment with a basic reagent is carried out prior to the extraction process, i.e. the plant material or an alcoholic extract thereof may be treated with the basic reagent, e.g. aqueous ammonia, to liberate the conopharyngine base prior to the extraction procedure instead of subsequently thereto. However, the yields of the extraction procedure with the starting material pretreated with the basic reagent are not too favorable.

What is claimed is:

1. A new crystalline product of manufacture selected from the group consisting of conopharyngine of the formula,

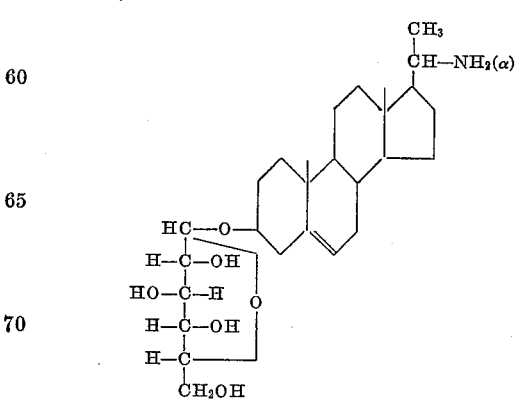

said compound analyzing for the empircal formula: $C_{27}H_{45}O_6N$, being characterized by a melting point of 285–288° C. and by an infrared absorption spectrum, taken in a hydrocarbon oil, with the following bands (expressed in reciprocal centimeters and classified in groups of diminishing strength): strong bands at 2860–2960, 1460, 1376, 1068 and 1016; medium bands at 3400, 3265, 1308, 1280, 1161, 1128, 1113, 1044, 924 and 896; medium-weak bands at 3226, 1265 and 1194; weak bands at 1595, 974, 950, 865, 837, 821, 795, 718 and 690; and shoulders at 1364, 1346 and 1084; being soluble in an acid medium, moderately soluble in methanol and insoluble in a basic medium, and acid addition salts thereof.

2. As a new crystalline product of manufacture conopharyngine of the formula,

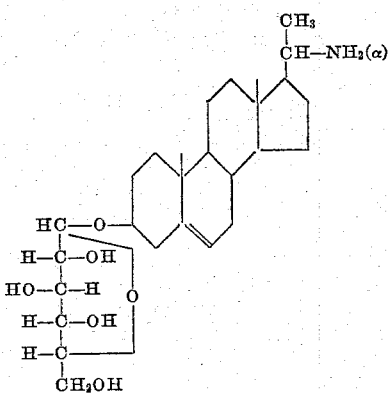

said compound analyzing for the emipirical formula: $C_{27}H_{45}O_6N$, being characterized by a melting point of 285–288° C. and by an infrared absorption spectrum, taken in a hydrocarbon oil, with the following bands (expressed in reciprocal centimeters and classified in groups of diminishing strength): strong bands at 2860–2960, 1460, 1376, 1068 and 1016; medium bands at 3400, 3265, 1308, 1280, 1161, 1128, 1113, 1044, 924 and 896; medium-weak bands at 3226, 1265 and 1194; weak bands at 1595, 974, 950, 865, 837, 821, 795, 718 and 690; and shoulders at 1364, 1346 and 1084; being soluble in an acid medium, moderately soluble in methanol and insoluble in a basic medium.

3. The hydrochloride of the compound of claim 1.

4. Process for the preparation of conopharyngine of the formula,

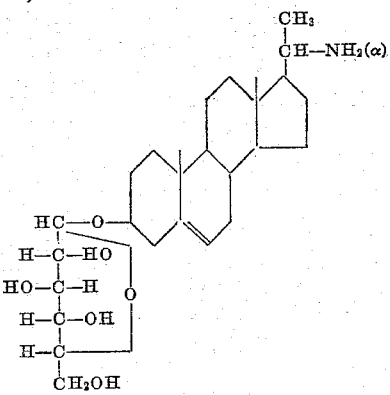

said compound analyzing for the empirical formula: $C_{27}H_{45}O_6N$, being characterized by a melting point of 285–288° C. and by an infrared absorption spectrum, taken in a hydrocarbon oil, with the following bands (expressed in reciprocal centimeters and classified in groups of diminishing strength): strong bands at 2860–2960, 1460, 1376, 1068 and 1016; medium bands at 3400, 3265, 1308, 1280, 1161, 1128, 1113, 1044, 924 and 896; medium-weak bands at 3226, 1265 and 1194; weak bands at 1595, 974, 950, 865, 837, 821, 795, 718 and 680; and shoulders at 1364, 1346 and 1084; being soluble in an acid medium, moderately soluble in methanol and insoluble in a basic medium, which comprises treating a methanol extract of root material of *Conopharyngia pachysiphon* with a mixture of methanol and chloroform in the presence of silicic acid, reacting the resulting extract containing copopharyngine hydrochloride with ammonia, separating the free base and crystallizing conopharyngine from methanol.

References Cited in the file of this patent

UNITED STATES PATENTS 2,455,214    Bennekou _____ Nov. 30, 1948

OTHER REFERENCES

Gaunt et al.: Endocrinology, 1954 (vol. 54), pages 272–283.

Korte et al.: Naturforsch, vol. 10B (1955), pages 499–503.

UNITED STATES PATENT OFFICE
CERTIFICATE OF CORRECTION

Patent No. 3,036,060            May 22, 1962

Robert Armistead Lucas et al.

It is hereby certified that error appears in the above numbered patent requiring correction and that the said Letters Patent should read as corrected below.

Column 7, line 47, for the claim reference numeral "1" read -- 2 --; column 8, line 29, for "680" read -- 690 --; line 35, for "copopharyngine" read -- conopharyngine --.

Signed and sealed this 5th day of May 1964.

(SEAL)
Attest:
ERNEST W. SWIDER

Attesting Officer

EDWARD J. BRENNER
Commissioner of Patents